Sept. 29, 1970  T. A. NUSSMEIER  3,531,205
LIGHT BEAM AIMING DEVICE
Filed Jan. 15, 1968  2 Sheets-Sheet 1

INVENTOR
THOMAS A. NUSSMEIER,
BY
John Holtrichter, Jr.
ATTORNEY.

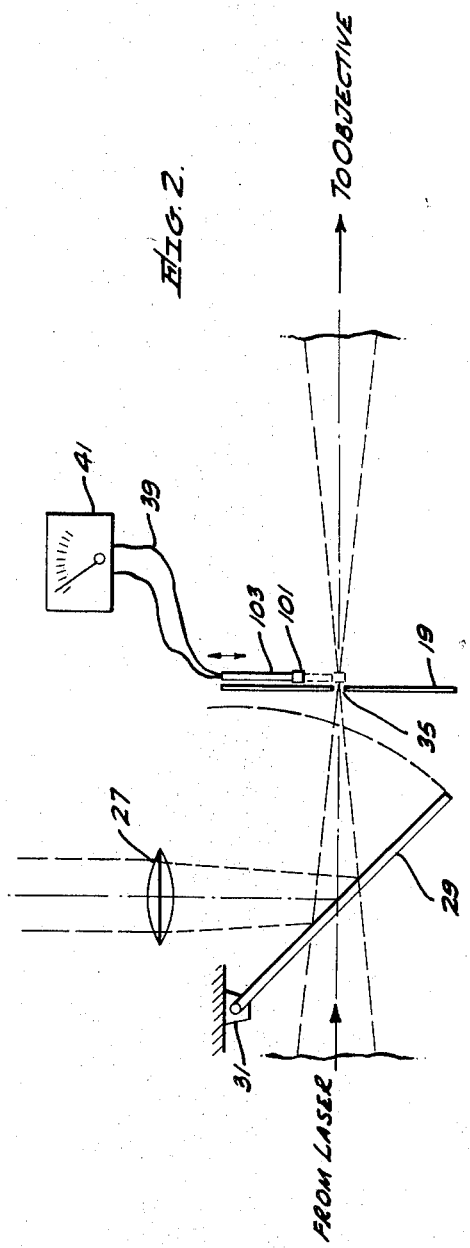
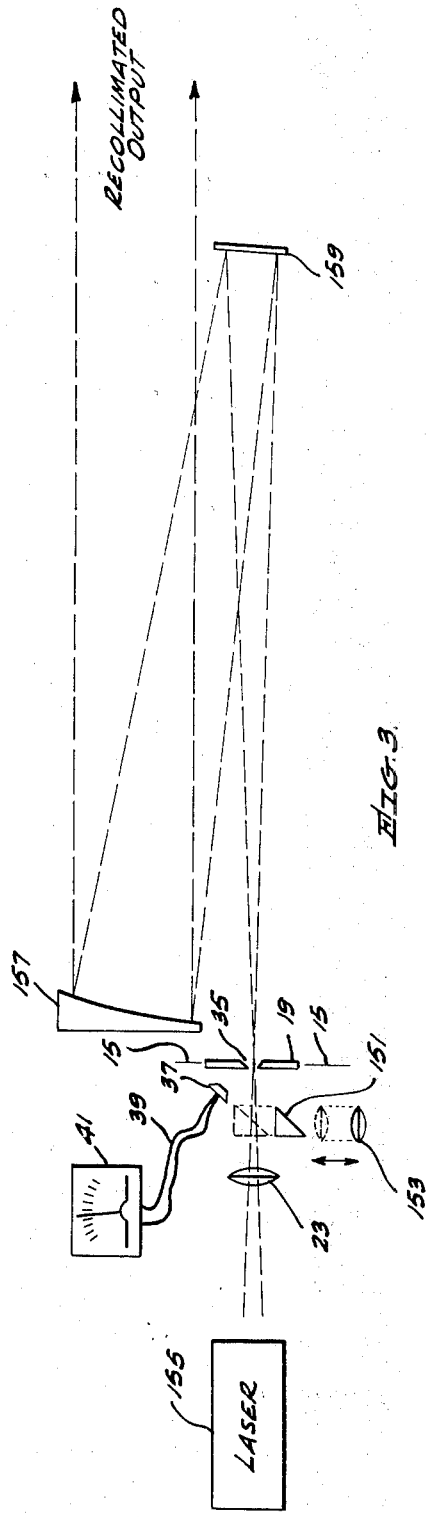

United States Patent Office 3,531,205
Patented Sept. 29, 1970

3,531,205
LIGHT BEAM AIMING DEVICE
Thomas A. Nussmeier, Thousand Oaks, Calif., assignor to Hughes Aircraft Company, Culver City, Calif., a corporation of Delaware
Filed Jan. 15, 1968, Ser. No. 697,838
Int. Cl. G01j 1/00; G01b 11/26
U.S. Cl. 356—121
11 Claims

ABSTRACT OF THE DISCLOSURE

This is a device for aiming a beam of optical frequency energy at a specific target. The device includes a substantially transparent plate having a hole through its thin dimension and that is placed in an image plane of an objective element. A beam of optical energy is focused on the image plane and positioned to pass through the hole in the plate and onto the objective element. An optical energy detector is positioned to be responsive to the optical energy for determining when the beam passes through the hole in the plate. The device is sighted by viewing the target through an optical system coupled to the plate and focused on the image plane, which system receives substantially only visible light energy on the image plane propagating through the plate from the objective element.

---

In the field of communications, a very important area of investigation and utilization has recently opened up. This is the field of optical energy beam communications where the beam is generally provided by a laser. Here, the laser is usually at a distance from the receiver and because of the narrowness of the collimated beam, it is extremely difficult to accurately aim the beam and hit or illuminate the receiving target. Accordingly, in this type system the laser is generally used in conjunction with a reflecting or refracting telescope.

It has been the general practice in the past to align the laser transmitting telescope by boresighting with an auxiliary spotting scope. This method requires that the spotting scope and the main telescope remain in precise alignment at all times, which is difficult to achieve in practice. Furthermore, the spotting scope seldom has the resolution required to accurately determine where the narrow beam is pointed. In order to have sufficient resolution, it must be optically equivalent to the laser collimating optics.

Another method, for example, has been to mount a laser on the side of a reflecting telescope and to direct the laser output into the telescope eyepiece via a partially reflecting mirror placed at 45° to the beam, while the sighting assembly (mounted beyond the primary focal plane of the telescope) comprises two lenses with a graticule placed at a secondary focal plane between them allowing a viewer to see the target through the partially reflecting mirror. This last method has the advantage of being able to utilize the high resolution power of the main telescope but has the disadvantage of not providing for a truly accurate means of directing the laser beam on target because the exact direction of the laser beam or position of the laser image in the primary image plane is not known to the observer.

The most recent method devised for laser-telescope alignment has been a system whereby the energy of the laser focused by a first collimating lens is superimposed on the image of the target focused by the objective or second collimating lens. When conjunction is obtained, the laser-telescope system is transmitting at maximum efficiency to the target. To accomplish this with visible energy generating lasers, a reticle is generally placed at the focal plane of the objective and the eyepiece is adjusted until the smallest spot is obtained in the center of the reticle. The spot is formed by a small amount of laser energy reflected from the reticle back through the eyepiece and viewed with a beam splitter or dichroic mirror.

With infrared lasers, the above concept is more difficult to instrument. It is, of course, impossible to see the energy that would be reflected from the reticle. In addition, if dispersive (refractive) optics are used, the positions of the visible and infrared (IR) images would not coincide. Thus, a new arrangement overcoming these disadvantages would provide a significant advancement of the art.

It is therefore an object of the present invention to provide an improved light beam aiming device.

It is another object of this invention to provide a relatively simple means of accurately aiming a very narrow light beam at a specific target.

It is still another object of the invention to provide a means of directing an invisible beam of energy at a distant target with extreme accuracy.

These and other objectives are achieved, according to one embodiment of the invention, in a device for aiming a beam of optical energy at a specific target. The device comprises an objective element defining an image plane and a pierced graticule substantially transparent to visible light energy disposed in the image plane. The device includes a means for focusing a beam of optical energy on the image plane and also provides means for positioning the focused beam to pass through the hole in the graticule and onto the objective element. An optical energy detector responsive to the optical energy is utilized to determine when the collimated beam passes through the hole in the graticule. The device is sighted by an optical arrangement coupled to the graticule and focused on the image plane for receiving substantially only visible light energy on the image plane propagating through the graticule from the objective element. According to the invention, the optical energy detector may be either positioned on the side of the graticule opposite the objective element to detect and indicate any optical energy not passing through the hole in the graticule but reflected therefrom, or movably positioned adjacent the hole in the graticule on the same side thereof as the objective element to detect and indicate the amount of optical energy passing through the hole in the graticule.

The invention and specific embodiments thereof will be described hereinafter by way of example and with reference to the accompanying drawings wherein like reference numerals represent like elements or parts, and in which:

FIG. 2 illustrates a second embodiment of the invention wherein a photodetector may be positioned opposite a hole in a graticule to indicate proper positioning and focusing of the input high intensity optical energy beam; and FIG. 3 is a schematic diagram of still another embodiment of the invention wherein a reflecting type objective element is utilized.

Figure 1:
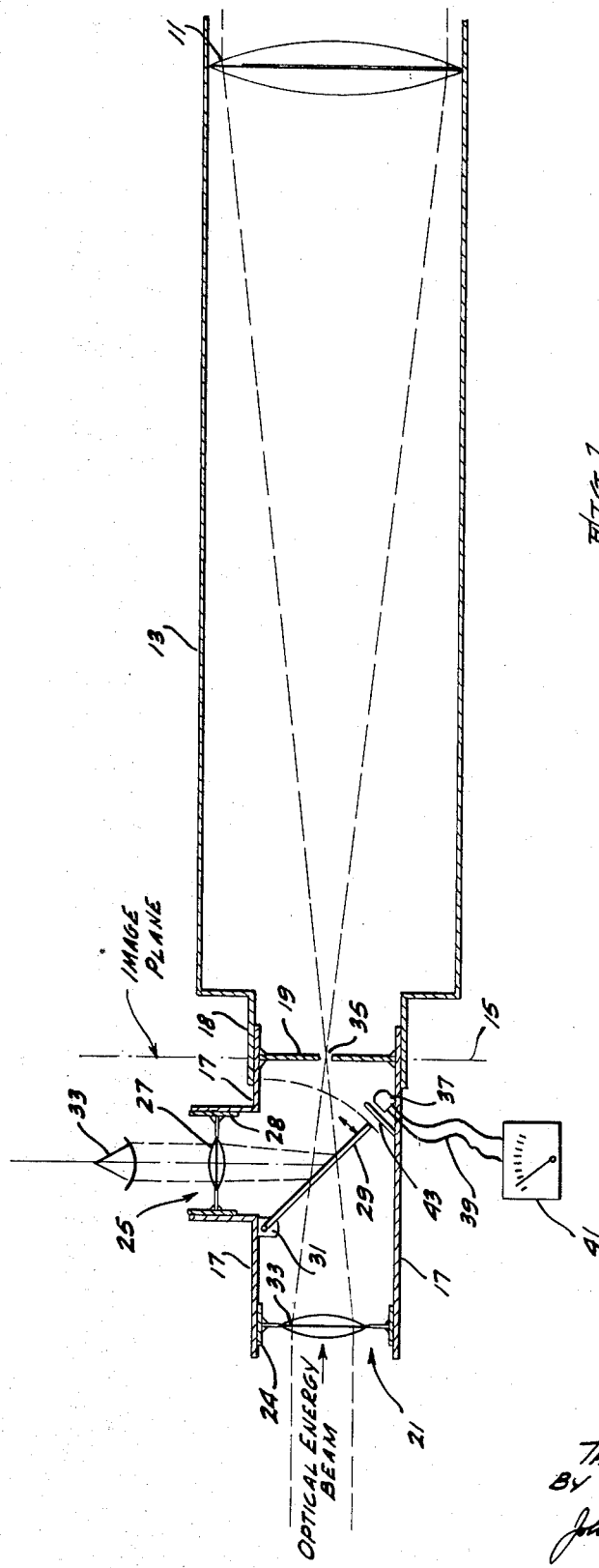
FIG. 1 is a schematic diagram illustrating an embodiment of the invention wherein a refracting type objective element is utilized.

With reference now to the drawings and more particularly FIG. 1, there is shown an optical objective element 11 mounted in a telescope supporting tube structure 13 and defining an image plane 15. The objective shown is the refractive type but may be advantageously replaced by a reflective objective as will be described later.

A graticule housing 17 is slidably attached for focusing purposes to an end 18 of the telescope tube 13. In the housing 17, a plate 19 substantially transparent to visible optical energy received from the target is mounted. The plate 19 is positioned to lie in the image plane 15 of the objective element 11 by sliding the housing 17 in or out with respect to the telescope tube 13. The housing 17 also includes an axial port or opening 21 adjacent which an optical energy generator focusing lens 23 is disposed in a movable lens mounting tube 24 so that such incoming energy may be focused on the image plane 15. A transverse port 25 is also provided in the housing 17 between the plate 19 and the lens 23 to accommodate a sighting lens assembly which includes a viewing eyepiece or lens 27 mounted in a movable eyepiece tube 28 and focused on the image plane 15 after being reflected by a pivoted mirror 29. The mirror 29 is pivoted as shown by a hinge assembly 31 attached to an upper inner wall of the housing 17 so that it may be swung out of the way when it is desired to transmit the optical energy passing through the lens 23 and the objective element 11 to the target, not shown. In the position shown in the drawing, the mirror 29 will reflect the visible optical energy intercepted by it as received from the target and reflect this energy through the sighting lens 27 so that it may be viewed by a viewer, here designated by reference numeral 33.

An essential aspect of the invention is a small hole 35 in the plate 19. This hole is most advantageously kept just large enough to pass the optical energy focused on the image plane 15 by the focusing lens 23. For example, in a device constructed according to the invention, a .004″ hole was pierced by a laser welder through the center of a ½″ diameter piece of glass used as the plate 19.

In this embodiment, an optical energy detector such as a photodetector 37 is mounted within the housing 17 adjacent the plate 19 and positioned to detect any optical energy that does not pass through the hole 35 and reflected by the plate 19. The photodetector 37 is connected by wires 39 to a meter 41 to indicate to an operator when the energy from the optical energy source is properly focused on the image plane and passing through the hole 35 in the plate 19. It can be seen that the higher the indication is on the meter 41, the less energy must be passing through the hole 35. The photodetector 37 may be shielded from detecting any optical energy not reflected from the plate 19 by a shielding member 43.

In operation, the telescope support tube structure 13 is pointed towards a target and the pivoted mirror 29 is positioned to reflect light from the objective element 11 passing through the plate 19 to the viewing eyepiece 27. The lens 27 is focused on the plate 19 situated in the image plane 15 by adjusting the position of the movable eyepiece tube 28 in the transverse port 25 of the graticule housing 17. The plate 19 is now adjusted to lie in the focal or image plane of the objective element 11 by sliding the housing 17 in or out of the end 18 of the tube 13. The telescope, including the housing 17, is now adjusted to position the target as seen by the viewer 33 so that it is centered about the hole 35 in the plate 19. The plate 19 may be scribed to provide a reticle having its center coincident with the hole 35.

At this time, the pivoted mirror 29 is removed from its reflecting position to allow the optical energy beam from an optical energy beam source such as, for example, a laser or a gallium arsenide emitter, not shown, to pass through the telescope toward the target. The energy from the optical energy source is now focused on the image plane 15 by adjusting the position of the collimating lens 23 mounted in the lens mounting tube 24.

Both the position and focus of the optical energy beam are determined even though this energy may be invisible to the eye of an observer simply by observing the meter 41 coupled to the photodetector 37. As stated before, the meter indicates the amount of energy not passing through the hole 35 and scattered from the plate 19. When the beam is properly positioned and focused, a null in the meter reading will be obtained, as all the energy will pass through the hole 35. The field of view of the detector 37 is restricted as shown to prevent energy scattered from the interior of the housing 17 from obscuring the null.

It should here be pointed out that the aiming device herein described provides an advantageous system to aim any beam of optical energy at a target, but it has an even further advantage over the prior art when an invisible beam from an infrared laser, for example, is to be aimed. This is true because the various optical elements of the invisible energy and those of the target viewing visible energy are separate and each can thus be optimized for performance. For example, optimum lenses such as silicon and germanium which are opaque to visible energy may be used as the focusing lens 23. In the case where an invisible beam generator is used, it will be necessary that the objective element 11 have the same focal length for both the visible part of the spectrum and for the invisible energy from an IR laser source, for example. In this case, the objective element 11 should be reflective as in a Cassegrain or Newtonian telescope as shown in FIG. 3.

In another embodiment of the invention, the optical energy detector is in the form of a photodetector 101 mounted on a slidable mounting member 103 adjacent the plate 19 as seen in FIG. 2. The detector 101 is shown in its nonindicating position but the dashed lines show that it may be moved downward toward a position opposite the hole 35 in the plate 19 so as to be able to detect and indicate when the beam from the optical energy source such as a laser is properly positioned and focused to pass through the hole 35. In this embodiment, the optimum adjustment is indicated by a peak reading on the meter 41. Of course, after the adjustment is completed, the member 103 is moved upward to clear the passage of energy through the hole 35 toward the objective element 11.

As mentioned above, FIG. 3 illustrates an embodiment of the invention where a reflecting type objective is used. However, it should be clearly understood that this type of objective may be used as well in place of the reflective type shown in the embodiment of FIG. 1. The device shown in FIG. 3 is basically similar to that shown in FIG. 1 except that a movable prism 151 and eyepiece 153 are used instead of the pivoted mirror 29 and eyepiece 27. Here, a beam of optical energy from an invisible collimated light source such as an IR laser 155 is focused by the collimating lens 23 on the image plane 15 and positioned to pass through the hole 35 in the plate or graticule 19 by the aid of the photodetector 37 and the meter 41. The meter is now read for a null indication. Of course, at this time the prism 151 is positioned so as not to intercept the energy generated by the laser 155. After this adjustment, the sighting prism 151 is moved to a position indicated by dashed lines to allow visual examination of the graticule 19 and the image of the target projected by a reflective type telescope objective lens 157 and a conventional folding reflector 159. The telescope and laser assembly are then moved to position the hole 35 in a graticule 19 over a desired point on the target as viewed through the eyepiece 153. Now, when the prism is moved out of the path of the beam, the laser energy will be pointed at the target.

As noted above, a reflecting mirror 157 is used to assure coincidence of the visible and the IR images. An off-axis telescope system is used to prevent masking the center of the laser output beam where the power density is maximum. The objective lens 157 is shown to be a paraboloidal section cut from a larger mirror to prevent the comatic and astigmatic distortion that would occur with a smaller, full paraboloid.

From the foregoing, it should be evident that the invention provides many advantages over the aiming devices heretofore available. For example, the collimated condition and positioning of the energy from the optical energy source can be continuously monitored by the permanent detector and meter installation shown in FIG. 1. Also, the visible eyepiece 27 can be adjusted to compensate for differences in individuals without affecting system operation. Further, the optical energy beam does not have to be perfectly collimated as it enters the device, since compensation is possible by adjusting the position of the collimating lens 23. A further advantage is that in the operating configuration, there is no transmission lost due to any auxiliary aiming devices heretofore generally required. A still further advantage is that the possibility of eye damage due to scattered high intensity energy is eliminated since the pivoted mirror 29 and the movable prism 151 effectively separate the light paths.

In practicing the invention, any suitable optic material may be used for the various optical elements described and, although only a limited number of specific embodiments have been herein illustrated, it will be appreciated that other organizations of the specific arrangements shown may be made within the spirit and scope of the invention. Additionally, other components or elements may be substituted for those which have been particularly named.

Accordingly, it is intended that the foregoing disclosure and drawings shall be considered only as illustrations of the principles of this invention and are not to be construed in a limiting sense.

What is claimed is:

1. A target viewing and laser beam aiming device, comprising:
   objective means including an objective element for defining an image plane;
   graticule means including a plate disposed in said image plane, said plate being substantially transparent to received light energy from said objective element and having a relatively small hole therein of sufficient diameter to just pass a focused beam of laser energy therethrough;
   adjustment means for focusing a beam of laser energy on said image plane and for positioning said beam to pass through said hole, onto said objective element, and toward a target;
   beam alignment detecting means including a detector responsive to said laser energy for determining when said beam passes through said hole; and
   sighting means optically coupled to said plate only when said beam is not propagated through said hole, said sighting means being focused on said image plane for simultaneously viewing said graticule and said received light energy that has propagated through said plate from said objective element and thereby aim said beam at a target.

2. A device according to claim 1, wherein said detector is positioned adjacent said plate on the side thereof opposite said objective element and responsive to laser energy reflected by said plate.

3. A device according to claim 1, wherein said detector is positionable adjacent said hole on the same side of said plate as said objective element and responsive to laser energy passing through said hole.

4. A device according to claim 1, wherein said sighting means includes an eyepiece and a hinged mirror positionable to simultaneously block the propagation of said beam of laser energy through said hole and to couple said eyepiece to said plate.

5. A device according to claim 3, wherein said sighting means includes an eyepiece and a hinged mirror having a first position simultaneously blocking the propagation of said beam of laser energy through said hole and coupling said eyepiece to said plate and a second position allowing the propagation of said beam of laser energy through said hole, and wherein said detector is positioned in front of said hole only when said mirror is in said second position, said detector being removable from said last mentioned position with said mirror in said second position to allow said beam of laser energy to propagate through said hole toward said target.

6. A device according to claim 2, wherein said sighting means includes an eyepiece and a prism optically coupled thereto, said prism being on the same side of said plate as said detector and a first position blocking said beam and simultaneously coupling said eyepiece to said plate, and a second position decoupling said eyepiece from said plate and not blocking said beam.

7. A device according to claim 1, wherein said adjustment means includes a movable lens housing and a beam focusing lens therein.

8. A device according to claim 1, wherein said sighting means includes an eyepiece and focusing means for focusing said eyepiece on said plate.

9. A device according to claim 1, wherein said objective element is a reflective element.

10. A device according to claim 1, wherein said objective element is a refractive element.

11. A target viewing and laser beam aiming device, comprising:
    objective means including an objective element for defining an image plane;
    graticule means including a plate disposed in said image plane, said plate being substantially transparent to received light energy from said objective element and having a relatively small hole therein of sufficient diameter to just pass a focused beam of laser energy therethrough;
    a laser generator producing a beam of laser energy;
    adjustment means coupled to the beam of laser energy produced by said laser generator for focusing a beam of laser energy on said image plane and for positioning said beam to pass through said hole, onto said objective element, and toward a target;
    beam alignment detecting means including a detector responsive to said laser energy for determining when said beam passes through said hole; and
    sighting means optically coupled to said plate only when said beam is not propagated through said hole, said sighting means being focused on said image plane for simultaneously viewing said graticule and said received light energy that has propagated through said plate from said objective element and thereby aim said beam at a target.

References Cited
UNITED STATES PATENTS 3,392,259   7/1968   Meier _____ 331—94.5 X RONALD L. WIBERT, Primary Examiner P. K. GODWIN, Assistant Examiner U.S. Cl. X.R.

250—199; 350—10; 356—122, 123, 152, 153, 247